(12) United States Patent
Lee et al.

(10) Patent No.: US 8,037,568 B2
(45) Date of Patent: Oct. 18, 2011

(54) WINDSHIELD WIPER ASSEMBLY

(75) Inventors: Albert Lee, Baltimore, MD (US);
Choon Bae Lee, Inchon (KR)

(73) Assignee: Alberee Products Inc., Baltimore, MD (US)

( * ) Notice: Subject to any disclaimer, the term of this patent is extended or adjusted under 35 U.S.C. 154(b) by 57 days.

(21) Appl. No.: 12/404,090

(22) Filed: Mar. 13, 2009

(65) Prior Publication Data

US 2009/0178226 A1    Jul. 16, 2009

Related U.S. Application Data

(63) Continuation-in-part of application No. 11/513,276, filed on Aug. 31, 2006, which is a continuation-in-part of application No. 11/228,334, filed on Sep. 19, 2005, now Pat. No. 7,634,834, application No. 12/404,090, which is a continuation-in-part of application No. 11/976,701, filed on Oct. 26, 2007, now Pat. No. 7,698,775.

(60) Provisional application No. 61/040,391, filed on Mar. 28, 2008.

(30) Foreign Application Priority Data

Feb. 12, 2009   (KR) ................. 10-2009-0011429

(51) Int. Cl.
*B60S 1/40* (2006.01)
*B60S 1/38* (2006.01)

(52) U.S. Cl. .............. 15/250.32; 15/250.43; 15/250.201

(58) Field of Classification Search ............... 15/250.43, 15/250.44, 250.361, 250.201, 250.451–250.454, 15/250.32, 250.48

See application file for complete search history.

(56) References Cited

U.S. PATENT DOCUMENTS

| | | | | |
|---|---|---|---|---|
| 2,974,341 | A * | 3/1961 | Hart | 15/250.32 |
| 3,192,551 | A * | 7/1965 | Appel | 15/250.43 |
| 5,392,489 | A * | 2/1995 | Mohnach | 15/250.201 |
| 7,293,321 | B2 * | 11/2007 | Breesch | 15/250.201 |
| 7,503,095 | B2 * | 3/2009 | Lin et al. | 15/250.43 |
| 7,587,783 | B1 * | 9/2009 | Lin | 15/250.43 |
| 7,634,834 | B2 * | 12/2009 | Lee | 15/250.43 |
| 7,698,775 | B2 * | 4/2010 | Lee | 15/250.201 |
| 2003/0159229 | A1 * | 8/2003 | Weiler et al. | 15/250.201 |
| 2005/0011033 | A1 * | 1/2005 | Thomar et al. | 15/250.201 |
| 2005/0172443 | A1 * | 8/2005 | Genet et al. | 15/250.201 |
| 2006/0026786 | A1 * | 2/2006 | Ku | 15/250.32 |
| 2006/0037167 | A1 * | 2/2006 | Nacamuli | 15/250.201 |
| 2006/0156529 | A1 * | 7/2006 | Thomar et al. | 29/450 |
| 2007/0061994 | A1 * | 3/2007 | Lee | 15/250.201 |

FOREIGN PATENT DOCUMENTS

| | | | |
|---|---|---|---|
| DE | 10120467 | * | 10/2002 |
| KR | 2001-0099956 A | | 11/2001 |
| KR | 10-0733623 B1 | | 6/2007 |
| KR | 10-2008-0086865 A | | 9/2008 |
| KR | 10-2008-0102404 A | | 11/2008 |

* cited by examiner

*Primary Examiner* — Gary Graham
(74) *Attorney, Agent, or Firm* — Birch, Stewart, Kolasch & Birch, LLP

(57) ABSTRACT

A windshield wiper assembly is provided that includes a pair of leaf spring elements supported generally parallel to each other with a space therebetween, each leaf spring element having a locating hole at an intermediate portion thereof, a flexible blade supported within the space between the leaf spring elements, and a bracket fixed to the intermediate portion of the pair of leaf spring elements and supporting said pair of leaf spring elements to provide the space therebetween. The bracket includes a pair of pressure distribution tabs, each pressure distribution tab extending from opposite sides of the bracket, and each pressure distribution tab being received in a corresponding one of the locating holes of the pair of leaf spring elements to locate the bracket at the intermediate portion of the pair of leaf spring elements.

11 Claims, 14 Drawing Sheets

WINDSHIELD WIPER ASSEMBLY

CROSS-REFERENCE TO RELATED APPLICATIONS

This application is a Continuation-In-Part of co-pending U.S. application Ser. No. 11/976,701, filed on Oct. 26, 2007, and is also a Continuation-In-part of co-pending U.S. application Ser. No. 11/513,276, filed on Aug. 31, 2006, which is a Continuation-In-Part of U.S. application Ser. No. 11/228,334, filed on Sep. 19, 2005. This application also claims the benefit of U.S. Provisional Application No. 61/040,391, filed Mar. 28, 2008. Finally, this application claims priority to Korean Application No. 10-2009-0011429, filed Feb. 12, 2009. The entirety of the above-identified applications, collectively, "the priority applications," are incorporated herein by reference.

BACKGROUND OF THE INVENTION

1. Field of the Invention

The present invention generally relates to a windshield wiper assembly. In particular, the present invention is directed to a windshield wiper assembly having a pair of leaf spring elements and a bracket connected at an intermediate portion of the pair of leaf spring elements.

2. Description of Related Art

Various types of windshield wiper assemblies having a body utilizing a pair of leaf spring elements are known. For example, one windshield wiper assembly uses two parallel pieces of spring steel to secure a squeegee therebetween. The two pieces of spring steel are spot welded together in spaced apart relationship with a portion of the squeegee being located between the two pieces of spring steel. Although this background art windshield wiper assembly eliminates the necessity of having multiple frame elements to make up the body of the windshield wiper assembly, the spot welding prevents easy replacement of the squeegee.

Another background art windshield wiper assembly uses two pieces of spring steel that hold a squeegee therebetween. An end cap is used to hold the two pieces of spring steel in position to hold the squeegee. Although this background art windshield wiper assembly also eliminates the necessity of having multiple frame elements, the end cap does not maintain the two pieces of spring steel sufficiently away from each other to allow for the squeegee to move freely longitudinally without binding between the two pieces of spring steel and the end cap grooves. In view of this, binding of the squeegee during operation of the windshield wiper assembly occurs.

BRIEF SUMMARY OF THE INVENTION

Accordingly, it is an object of the present invention to provide a windshield wiper assembly, which eliminates the above problems encountered with windshield wiper assemblies according to the background art.

In order to overcome one or more drawbacks of the prior art windshield wiper assemblies, an object of the present invention is to provide a windshield wiper assembly that includes a bracket for attaching a windshield arm to a pair of leaf spring elements such that the force applied from the windshield wiper arm to the pair of leaf spring elements is provided at an intermediate portion of the pair of leaf spring elements.

Another object of the present invention is provide a bracket that is configured to receive most conventional windshield wiper arms without altering the force transmission from the windshield wiper arm to the pair of leaf spring elements at the intermediate portion.

Yet another aspect of the present invention is to provide a wind spoiler located along an upper surface of the pair of leaf spring elements to improve the contact between a wiper blade supported by the pair of leaf spring elements and a windshield of a vehicle.

According to principles of this invention, a windshield wiper assembly is provided that includes a pair of leaf spring elements supported generally parallel to each other with a space therebetween, each leaf spring element having a locating hole at an intermediate portion thereof, a flexible blade supported within the space between the leaf spring elements, and a bracket fixed to the intermediate portion of the pair of leaf spring elements and supporting said pair of leaf spring elements to provide the space therebetween. The bracket includes a pair of pressure distribution tabs, each pressure distribution tab extending from opposite sides of the bracket, and each pressure distribution tab being received in a corresponding one of the locating holes of the pair of leaf spring elements to locate the bracket at the intermediate portion of the pair of leaf spring elements.

In another aspect, each pressure distribution tab includes a protrusion that is received in said correspond one of the locating holes of the pair of leaf spring elements and a shoulder configured to press against a portion of the corresponding leaf spring element.

In a further aspect, each of the leaf spring elements may include a first fixing slot located adjacent the locating hole and the bracket may include a first pair of fixing tabs. Each of the first pair of fixing tabs extend from the opposite sides of the bracket, and each of the first pair of fixing tabs may be received in one of the first fixing slots of the pair of leaf spring elements to attach the bracket at the intermediate portion of the pair of leaf spring elements.

In still a further aspect, each of the leaf spring elements may include a second fixing slot located adjacent the locating hole and opposite the first fixing slot and the bracket may include a second pair of fixing tabs. Each of the second pair fixing tabs extend from the opposite sides of the bracket, and each of the second pair of fixing tabs may be received in one of the second fixing slots of the pair of leaf spring elements to attach the bracket at the intermediate portion of the pair of leaf spring elements. In addition, each fixing tab of the first and second pairs of fixing tabs may be substantially u-shaped. And the bracket may be made as a single piece of sheet metal.

In another aspect, the windshield wiper assembly may include a bracket cover connected at opposite sides of the bracket. The bracket cover may include a skirt extending below the bracket to cover a portion of the pair of leaf spring elements at the intermediate portion. The bracket cover may include a pair of spoiler restraining portions at opposite ends thereof.

In a further aspect, the windshield wiper assembly may include at least one spoiler connected to the pair of leaf spring elements and may extend in an opposite direction from the blade. An end of the spoiler may be received in one of the pair of spoiler restraining portions.

In a different aspect, the bracket may include at least one cut-out formed in each of the opposite sides of the bracket and the bracket cover may include at least one tab extending from opposite sides of the bracket cover, where each of the at least one tabs extends towards and is received in the corresponding cut-outs of the bracket. The at least one cut-out may include a pair of cut-outs formed in each of the opposite sides of the bracket and the at least one tab may include a pair of tabs extending from each of said opposite sides of the bracket cover, each tab extending towards and received in one of the cut-outs of the bracket.

In still another aspect, the intermediate portion may be located at the center of the pair of leaf spring elements.

In a different aspect, the windshield wiper assembly may include at least one spoiler having a first end connected to the pair of leaf spring elements, where the spoiler extends in an opposite direction from the blade to form a second end. The at least one spoiler may be symmetrical about a plane passing through the center of the spoiler and may include a protuberance at the second end.

In yet another aspect, the blade may include a spoiler having a first end formed integral with the blade and extending in a direction away from the first end to form a second end. The spoiler may include a protuberance at the second end.

In still a further aspect, the bracket may include a base portion that is configured to allow the second end of the spoiler to pass between the bracket and the pair of leaf spring elements. The base portion may include a convex shape.

In a different aspect, the bracket may be made of a single piece of sheet metal.

In another aspect, the bracket may include a base portion fixed to the pair of leaf spring elements, and a pair of side walls extending upward from the base portion. Each side wall may a first through hole located substantially in the center of the bracket. The bracket may also include a post extending between the pair of side walls, where the post, the first through hole, and the pressure distribution tab are substantially aligned along a straight line. The straight line may be substantially perpendicular to the intermediate portion of the pair of leaf spring elements.

In a further aspect, each side wall may include a second through hole located above and off-center from the first through hole.

In a different aspect, each side wall may include a pair of substantially u-shaped fixing tabs extending from each side wall to hold a corresponding leaf spring element of the pair of leaf spring elements. The post and the first fixing hole may be located between the substantially u-shaped fixing tabs.

In still another aspect, the base portion may include the pair of pressure distribution tabs extending the base portion.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to exemplary embodiments of the present invention, examples of which are illustrated in the accompanying drawings. Wherever possible, the same reference numbers will be used throughout the drawings to refer to the same or similar parts. A first exemplary embodiment of the windshield wiper assembly according to the present invention is shown in FIGS. 1-6.

Figure 1:
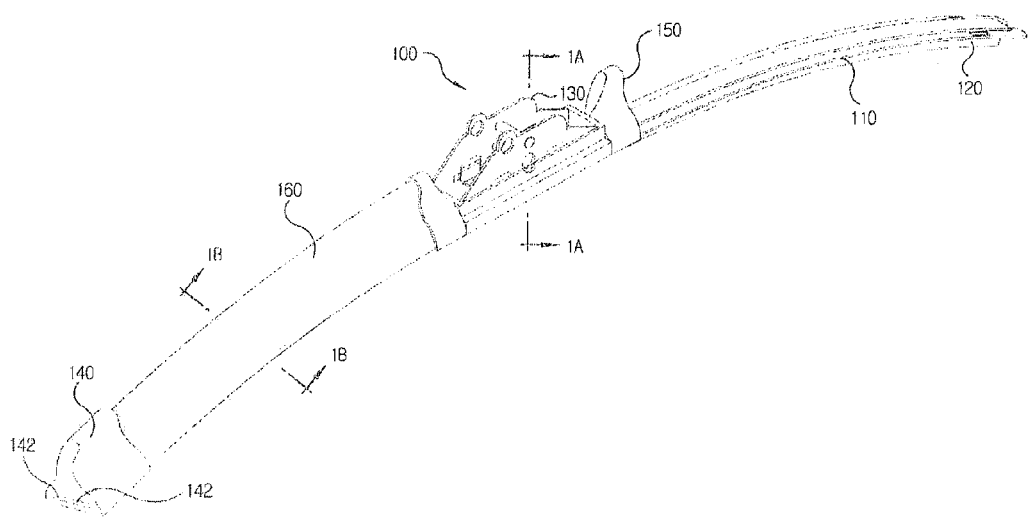
FIG. 1 is a perspective view of a windshield wiper assembly according to a first exemplary embodiment of the present invention.
Figure 1A:
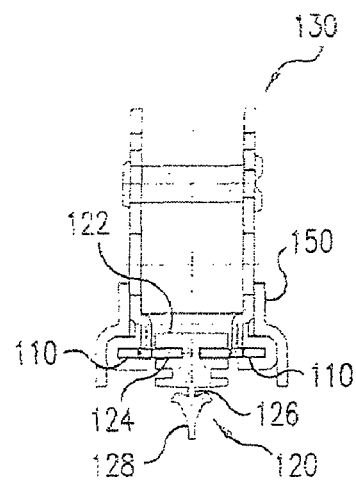
FIGS. 1A and 1B are cross-sectional views of the windshield wiper assembly at sectional lines 1A-1A and 1B-1B, respectively, of FIG. 1.
Figure 1B:
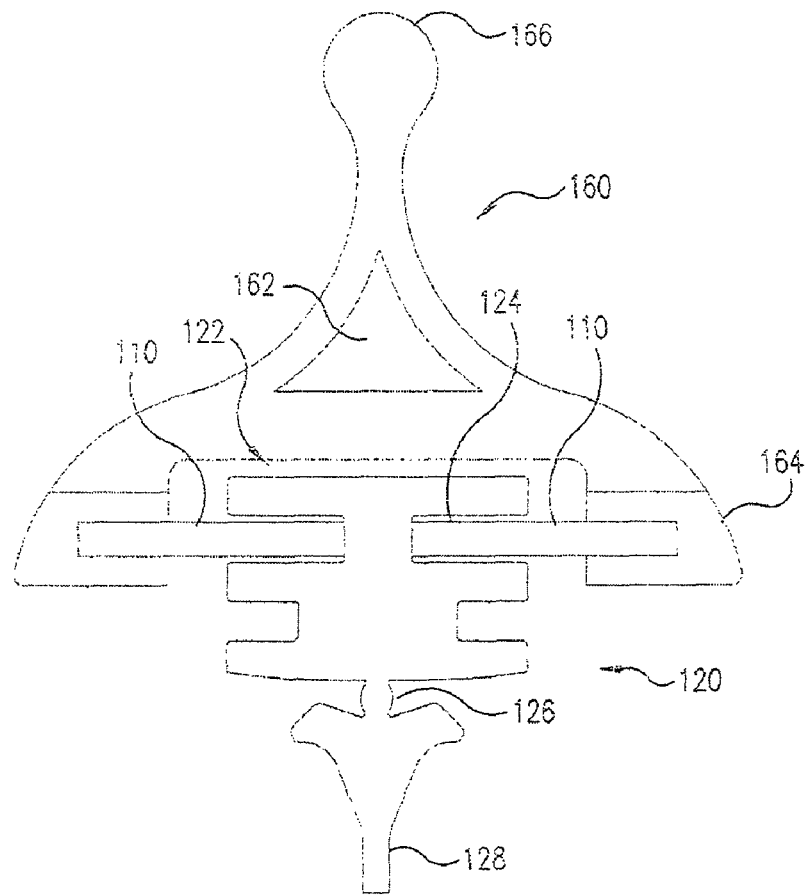

As seen in FIGS. 1, 1A, and 1B, the windshield wiper assembly 100 includes a pair of leaf spring elements 110, a flexible wiper blade or squeegee 120 held between the pair of leaf spring elements 110, and a bracket 130 connected at an intermediate portion of the leaf spring elements 110. A pair of end caps 140 (only one shown in FIG. 1) limit movement of the wiper blade 120 in the wiper blade assembly 100. A bracket cover 150 is connected to the bracket 130 and covers the pair of leaf spring elements 110 at the intermediate portion thereof. A pair of spoilers 160 independent of the wiper blade 120 may be provided. In this configuration, the windshield wiper assembly 100 is connectable to many different conventional wiper arms (not shown). Depending on the type of windshield wiper arm, an adapter that is mountable on the bracket 130 may be required to properly connect the windshield wiper arm to the bracket 130. Various types of adapters will be described in detail below.

Figure 2:
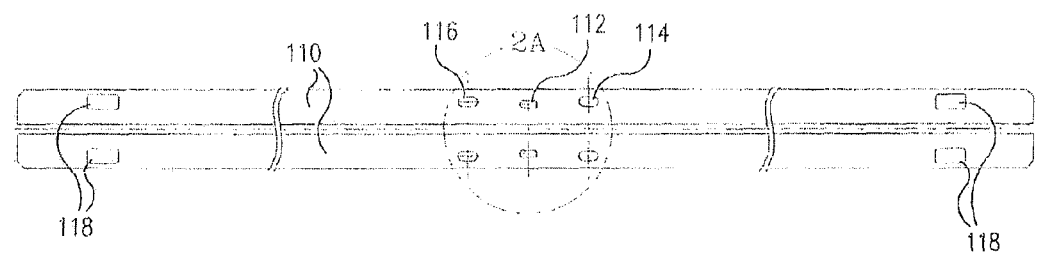
FIG. 2 is a plan view of a pair of leaf spring elements of the windshield wiper assembly of FIG. 1.

As shown in FIG. 2, each of the pair of leaf spring elements 110 includes a locating hole 112, a first fixing slot 114, and a second fixing slot 116. The bracket 130 is securable to the pair of leaf spring elements 110 via the locating holes 112, first fixing slot 114, and second fixing slot 116, which will be described below. In this exemplary embodiment, the locating holes 112 are provided at the intermediate portion of the pair of leaf spring elements 110, particularly, at the center of each leaf spring element 110 in a longitudinal direction. End cap fixing slots 118 may be formed in opposite ends of the leaf spring elements to allow the end caps 140 to be attached to the leaf spring elements 110 via detents formed in the end caps 140.

The leaf spring elements 110 may be formed from spring steel or other suitable materials so long as the material provides sufficient contact between the wiper blade 120 and the windshield of the vehicle. In addition, the leaf spring elements 110 may be pre-formed to have a parabolic shape to assist in maintaining the wiper blade 120 in contact with the windshield as wiper blade moves across the windshield.

In this first exemplary embodiment, all of the locating holes and fixing slots may be cut or stamped out of the spring steel. In addition, the sizes of the locating holes and fixing slots may vary so long as the locating holes 112 are located at the intermediate portion of the pair of leaf springs 110 to properly locate the bracket 130 in the correct position. While the end cap fixing slots 118 are shown being formed in the interior of the leaf spring elements 110, they can also be formed to at an edge of the leaf spring elements 110 as described in the priority applications. Because the leaf spring elements 110 are individually attached to the bracket 130, each of the leaf spring elements 110 can move with respect to each other as the wiper blade assembly 100 moves across a windshield. As such, the end cap fixing slots 118 should be sufficiently sized to allow the individual leaf spring elements 110 to move independently within the end caps 140. End caps 140 may be provided with through holes 142 to allow the ends of the leaf spring elements 110 to move within the end caps 140.

Figure 2A:
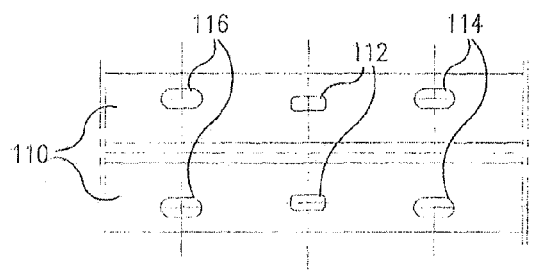
FIG. 2A is a detailed view of the leaf spring elements corresponding to call-out 2A.

As shown in greater detail in FIG. 2A, the locating holes 112 are also located substantially in the center of the leaf spring elements 110 in a width direction, while the first and second fixing holes 114, 116 are located between the center of the leaf spring elements 110 and an exterior edge of the leaf spring elements 110. As a result, the force of the wiper arm pressing on the bracket 130 is transferred to each leaf spring element 110 substantially at the center of the leaf spring element 110. The bracket 130 can be easily attached to the pair of leaf spring elements 110 at the first and second fixing holes 114, 116. This attachment will be described in greater detail below.

The bracket 130 will be described with reference to FIGS. 3, 3A, 3B, and FIG. 4. The bracket 130 includes a substantially planar base member or base portion 131 and a pair of side walls 132 extending upward from the base portion 131. By providing the base portion 131 at the bottom of the bracket 130, rather than connecting the side walls 132 at the top thereof, the bracket 130 provides greater gripping power of the wiper blade 120 and greater dimensional stability than conventional brackets. The bracket 130 includes a pair of pressure distribution tabs 134 extending from opposite sides of the bracket 130, and each pressure distribution tab 134 includes a protrusion 134a and a resulting pair of shoulders 134b.

Figure 3:
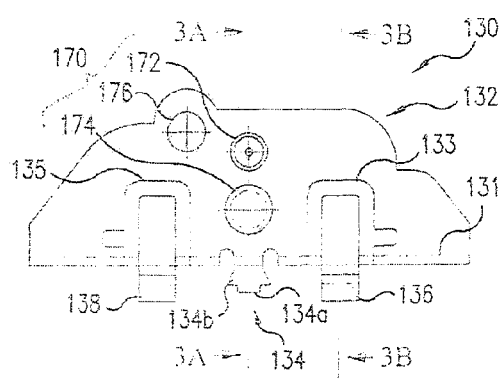
FIG. 3 is an elevation view of the bracket of the windshield wiper assembly of FIG. 1, FIGS. 3A and 3B are cross-sectional views of the bracket at sectional lines 3A-3A and 3B-3B, respectively, of FIG. 3.
Figure 3A:
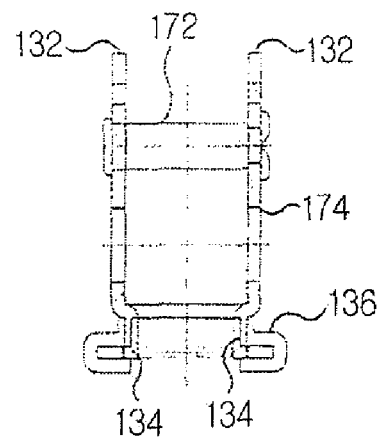

The pressure distribution tabs 134 can extend from either the side walls 132 or the base member 131, and the protrusions 134a are arranged to be inserted into the corresponding locating holes 112 on the leaf spring elements 110, as best seen in FIG. 3A. In particular, the protrusions 134a are receivable in the locating holes 112 of the leaf spring elements 110 such that the leaf spring elements can flex and move up and down the protrusions 134a. The shoulders 134b of the pressure distribution tabs 134 are brought into contact with the leaf spring elements 110 to press the wiper blade against the windshield. As a result of this configuration of the pressure distribution tabs 134, the amount of horizontal and vertical displacement of the leaf spring elements 110 can be controlled. In addition, the pressure distribution tabs 134 may control the amount of rotational movement of the leaf spring elements 110 with respect to the bracket 130.

Figure 3B:
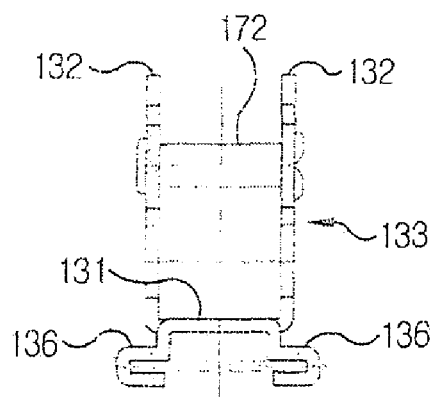
Figure 4:
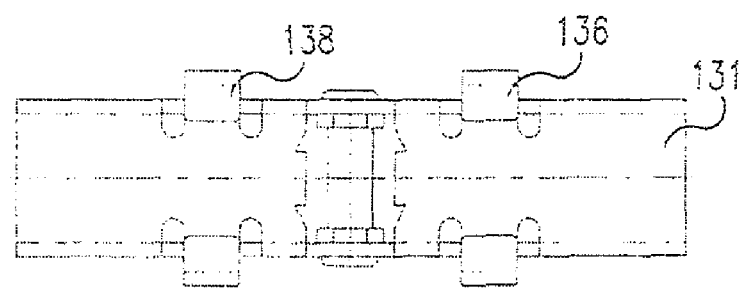
FIG. 4 is a bottom plan view of the bracket of the windshield wiper assembly of FIG. 1.

A first pair of fixing tabs 136 is provided at opposite sides of the bracket 130 and each tab of the first pair of fixing tabs 136 is configured to wrap around the corresponding leaf spring element 110. The ends of the fixing tabs 136 can be inserted into respective first fixing slots 114, as best seen in FIG. 3B. A second pair of fixing tabs 138 is provided at opposite sides of the bracket 130 and each tab of the second pair of fixing tabs is also configured to wrap around the corresponding leaf spring element 110 and into respective second fixing slots 114. In this exemplary embodiment, the first and second pair of fixing tabs 136, 138 are arranged on opposite sides of the pressure distribution tab 134 and assist in securing the bracket 130 to the pair of leaf spring elements 110 and in maintaining a sufficient space between the leaf spring elements 110 so as to receive the wiper blade 120 between the leaf spring elements 110. To this end, the first and second pair of fixing tabs 136, 138 may be substantially u-shaped.

The bracket 130, including the pressure distribution tabs 134 and the first and second pair of fixing tabs 136, 138 may be formed from a single piece of sheet metal.

Opposing side walls 132 may include a first pair of cut-outs 133 and a second pair of cut-outs 135 formed therein that are configured to allow the bracket cover 150 to be attached to the bracket 130, which will be described in greater detail below. In addition to the first and second pair of cut-outs 133, 135, the bracket 130 is configured to provide connectivity to many different conventional windshield wiper arms via connector means 170. The connector means 170 may include a post 172, which may be in the form of a rivet or pin, that extends between the opposing side walls 132, a first through hole or central hole 174 formed in each of the opposing side walls 132, and a second through hole or topside hole 176 formed in each of the opposing side walls 132.

As shown in FIG. 3, the post 172 and the central hole 174 of the connector means 170 are arranged above the pressure distribution tab 134 such that a straight line passing through the center of each would be substantially perpendicular to the surface of the leaf spring elements 110 when the bracket 130 is attached at the intermediate portion. With this configuration, most conventional windshield wiper arms can be attached to the bracket 130 and the resulting driving force of the windshield wiper arm can be transferred to the intermediate portion of the pair of leaf spring elements 110. For example, an appropriately configured adapter can be attached to the bracket 130 via the post 172, such that the adapter is configured to receive an end of the windshield wiper arm therein. Alternatively, the first through hole 174 may be sized to receive windshield arms that include conventional 3/16 inch or 1/4 inch side pins. The second through hole 176 is located above and off-center from the post 172 for those conventional windshield wiper arms that may have different right side/left side drive configurations.

In this manner, the first exemplary windshield wiper assembly 100 is configured to cooperate with most conventional windshield wiper arms and provide a uniform force distribution along the wiper blade 120 independent of the connection mechanism. In other words, the wiper blade 120 can be maintained in close contact with the windshield regardless of the type of windshield wiper arm.

Figure 5:
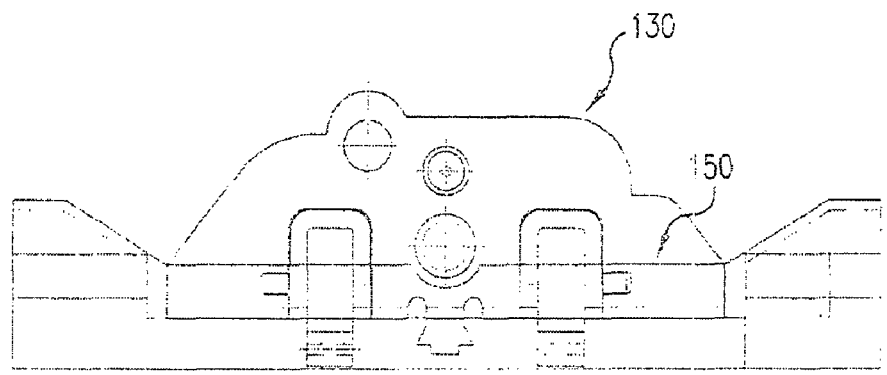
FIG. 5 is an elevation view of the bracket and bracket cover of the windshield wiper assembly of FIG. 1.

As shown in FIG. 1 and FIG. 5, the windshield wiper assembly may include the bracket cover 150 to cover the pressure distribution tabs 134 and fixing tabs 136, 138 to prevent foreign material from being caught between the bracket 130 and the pair of leaf spring members 110. The bracket may be made of any suitable material, such as plastic. Further details regarding the bracket cover 150 will be referenced with respect to FIGS. 6, 6A, 6B, and 6C. In particular, the bracket cover 150 includes a skirt 152 that extends below the bracket 130 to cover a portion of the leaf spring elements 110 at the intermediate portion. The bracket cover 150 also includes a pair of spoiler restraining portions 154 arranged at opposite ends of the bracket cover 150. Each of the spoilers 160 of the windshield wiper assembly 100 is securable between spoiler restraining portion 154 and a corresponding end cap 140.

Figure 6:
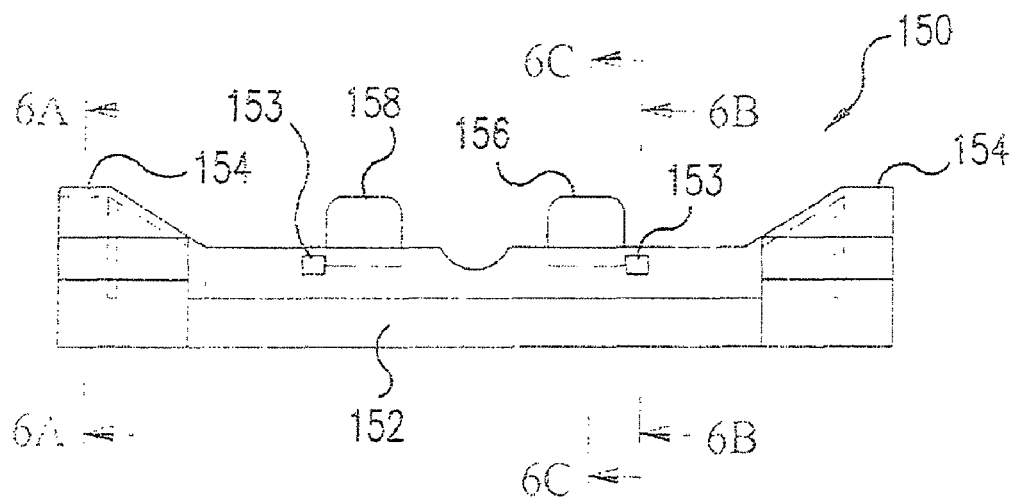
FIG. 6 is an elevation view of the bracket cover of FIG. 5, FIGS. 6A, 6B, and 6C are cross-sectional views of the bracket at sectional lines 6A-6A, 6B-6B, and 6C-6C, respectively, of FIG. 6.
Figure 6A:
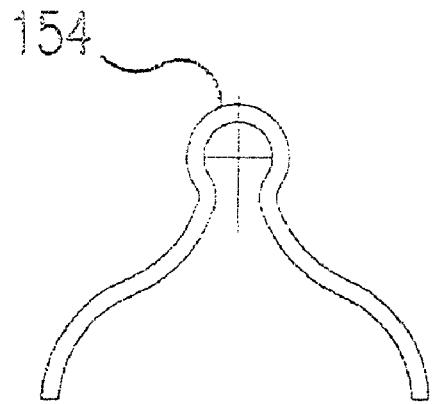
Figure 6B:
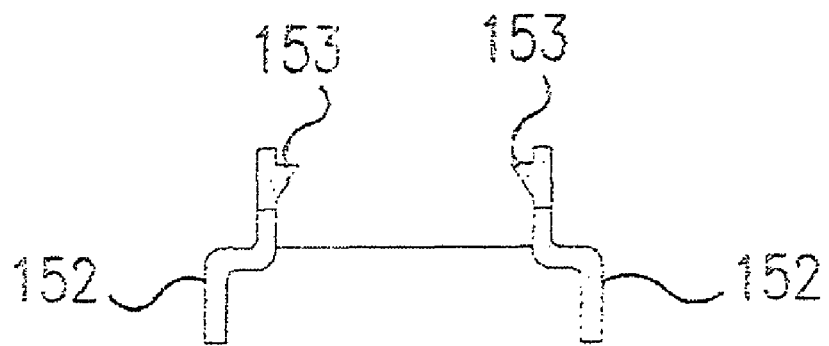
Figure 6C:
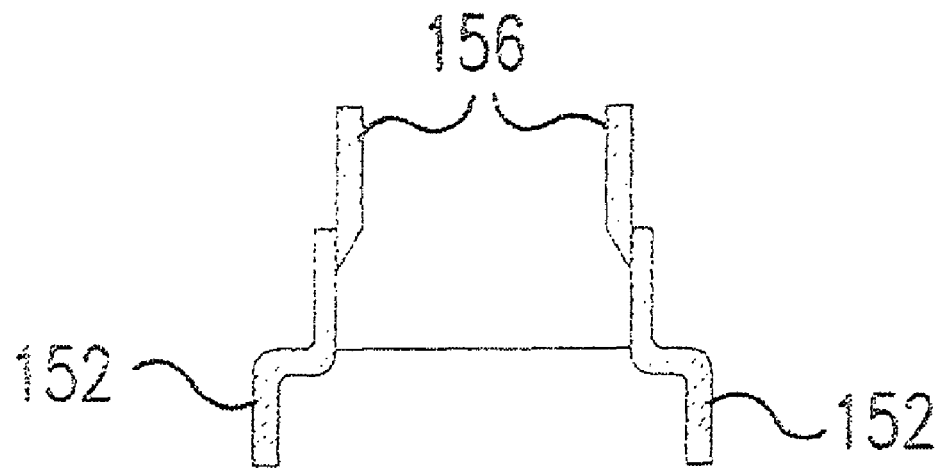

The bracket cover 150 is attached to the bracket 130 by at least one pair of tabs 156 extending from opposite sides of the bracket cover 150 and being received in corresponding cut-outs of the first pair of cut-outs 133 of the bracket 150. An additional pair of tabs 158 may extend from opposite sides of the bracket cover 150, the tabs 158 being received in corresponding cut-outs of the second pair of cut-outs 135. The bracket cover may also include first and second pair of pressing tabs 153 to provide an interference fit between the bracket cover 150 and the bracket 130, as best seen in FIG. 6B.

As described above with reference to the first exemplary embodiment of the windshield wiper assembly 100, a pair of spoilers 160 may be provided. As shown in FIG. 1B, the spoiler 160 is constructed of flexible synthetic rubber material and includes a hole 162 formed therethrough. The hole 162 may be formed to be passed through longitudinally, and in a variety of shape. In order words, in the present embodiment, a cross-section of the hole 162 includes, but is not limited to, forming in generally triangle shape to correspond the shape of cross-section of the spoiler 160, thus may be formed in a variety of shape. On the other hand, by forming the hole 162 in the spoiler 160, materials may be reduced in manufacturing. In addition, a base 164 of rigid plastic is integrally molded with the spoiler 160. Finally, the spoiler 160 includes a ball shaped protuberance 166 formed on a top thereof. The ball shaped protuberance 166 is centered with a longitudinal center line of the wiper blade 120, and the hole 162 is centered with the ball shaped protuberance 166. The ball shaped protuberance 166 also increases the holding force of the wiper blade 120 by forming a vortex that increases the low pressure zone on the side of the wiper blade 120 opposite to the source of wind as it flows across the wiper blade assembly 100. The spoiler is not limited to just this particular configuration. Any suitable spoiler, such as those spoilers described in the priority applications can be used.

As also seen in FIG. 1A, the wiper blade 120 includes a base portion 122 that includes cut-outs 124 to receive the leaf spring elements 110. A hinge portion 126 connects the blade portion 128 to the base portion 122. In this exemplary embodiment, the hinge portion 126 is rounded so as to increase the performance of the wiper blade 120 during operation of the windshield wiper assembly 100. While the first exemplary embodiment shows the wiper blade 120 independent of the spoiler 160, the present invention is not limited to this construction. A second exemplary embodiment where the spoiler is formed integral with the wiper blade is described below.

Figure 7:
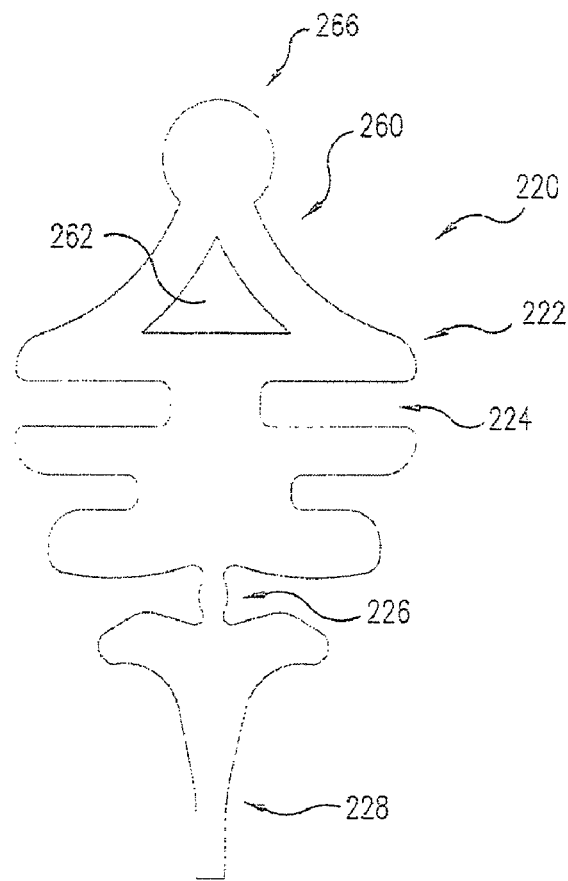
FIG. 7 is a cross-sectional view of a wiper blade according to a second exemplary embodiment of the present invention.
Figure 8:
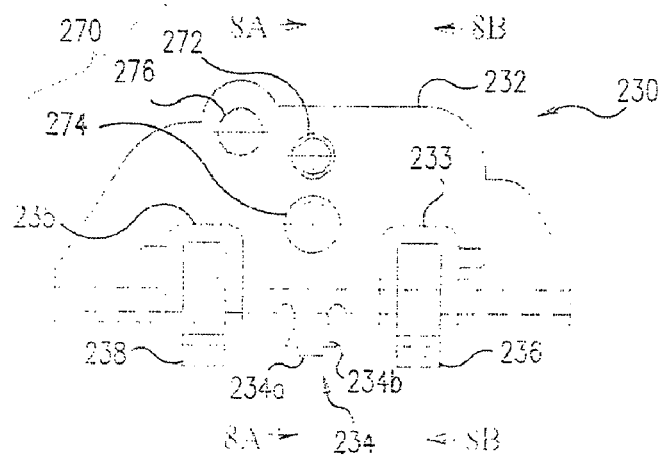
FIG. 8 is an elevation view of the bracket of the windshield wiper assembly according to the second exemplary embodiment.
Figure 8A:
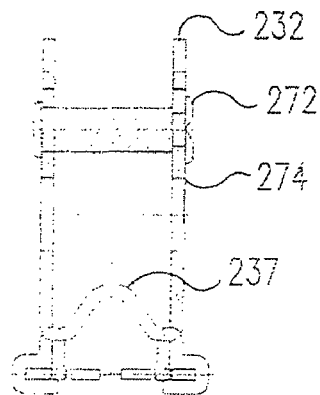
FIGS. 8A and 8B are cross-sectional views of the bracket at sectional lines 8A-8A and 8B-8B, respectively, of FIG. 8.
Figure 8B:
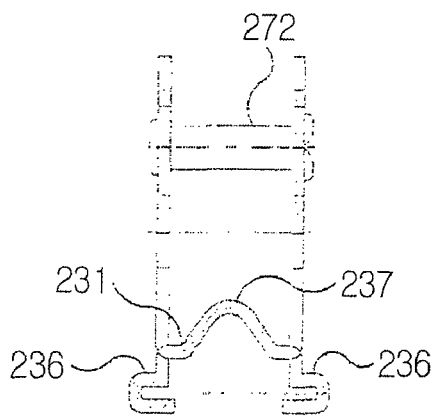
Figure 9:
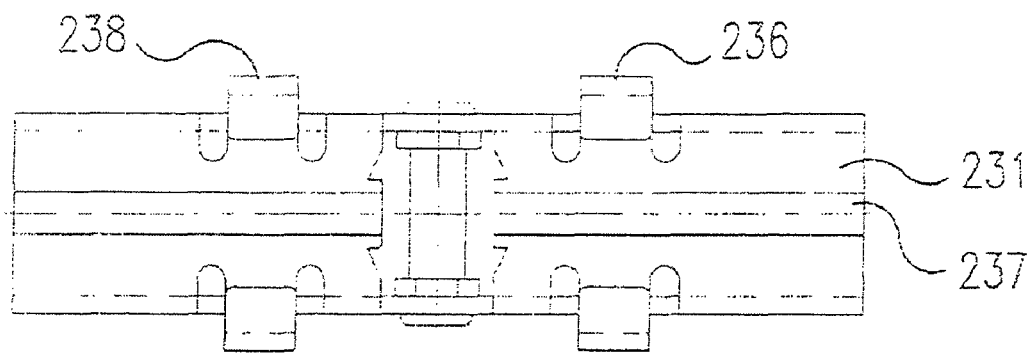
FIG. 9 is a bottom plan view of the bracket of the windshield wiper assembly of FIG. 8.
Figure 10:
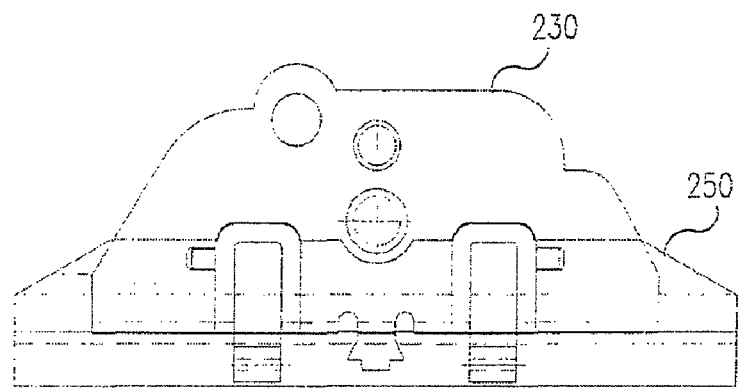
FIG. 10 is an elevation view of the bracket and bracket cover according to the second exemplary embodiment of the present invention.
Figure 11:
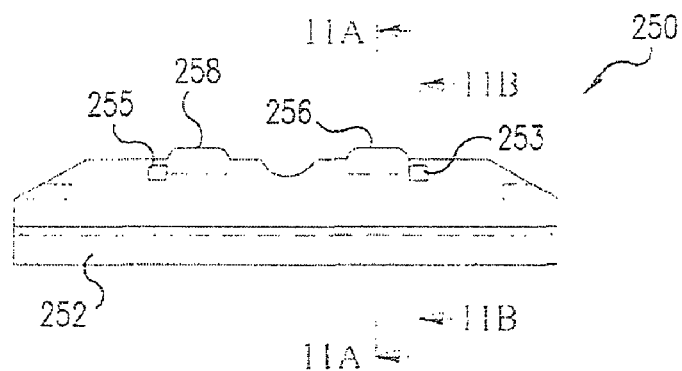
FIG. 11 is an elevation view of the bracket cover of FIG. 10, FIGS. 11A, 11B, and 11C are cross-sectional views of the bracket at sectional lines 11A-11A, 11B-11B, and 11C-11C, respectively, of FIG. 11.
Figure 11A:
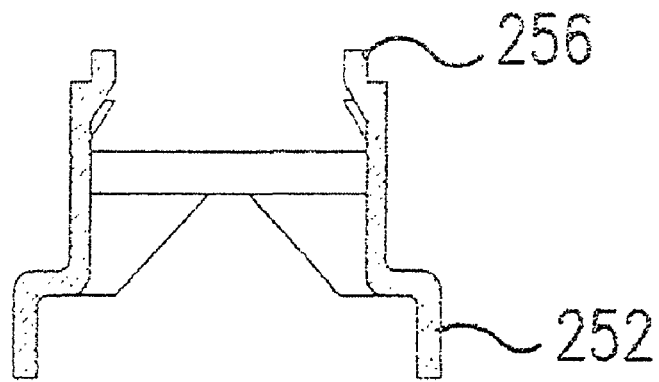
Figure 11B:
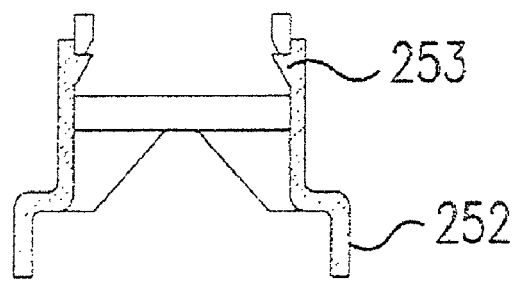

A second exemplary embodiment of the present invention is shown in FIGS. 7-12. Wherever possible, elements of the second exemplary embodiment that are similar to first embodiment have been given the same reference numeral, except the 100 series has been changed to the 200 series, and detailed explanations thereof have been omitted. According to a second exemplary embodiment of a windshield wiper assembly 200, the wiper blade 220, as shown in FIG. 7, includes a spoiler 260 formed integral therewith. In this exemplary embodiment, the wiper blade 220 has a base portion 222 that includes cut-outs 224 to receive the leaf spring elements 210 and a hinge portion 226 connecting the blade portion 228 to the base portion 222. The spoiler 260 may also include a hole 262 formed therethrough. In this second exemplary embodiment, the rigid base may be eliminated because the spoiler 260 is formed integral with the base portion 222. Similar to the first exemplary embodiment, the spoiler 260 includes a ball shaped protuberance 266 formed on a top thereof. The ball shaped protuberance 266 is centered with a longitudinal center line of the wiper blade 220, and the hole 262 is centered with the ball shaped protuberance 266. As described above, the ball shaped protuberance 266 increases the holding force of the wiper blade 220 by forming a vortex that increases the low pressure zone on the side of the wiper blade 220 opposite to the source of wind as it flows across the wiper blade assembly 200.

Because the spoiler 260 is formed integral with the wiper blade 220, and extends the entire length of the wiper blade 220, slight modification of the other components of the windshield wiper assembly 100 are required, most notably to the bracket 230 and bracket cover 250. As shown in FIGS. 8, 8A, 8B, and 9, the bracket 230 includes a base portion 231 that includes a raised portion 237 to allow the spoiler 260 to pass underneath the bracket 230. The remaining features of the bracket 230 are similar to those described above and no further explanation is necessary.

As shown in FIGS. 10, 11, 11A, and 11B, the bracket cover member 250 is similar to the bracket cover member 150 of the first exemplary embodiment, except that the pair of spoiler restraining portions have been eliminated. This is in part because the spoiler 260 is formed integral with the wiper blade 220, and as such, the spoiler 260 need only be restrained at opposite ends thereof by the pair of end caps 240.

Figure 12:
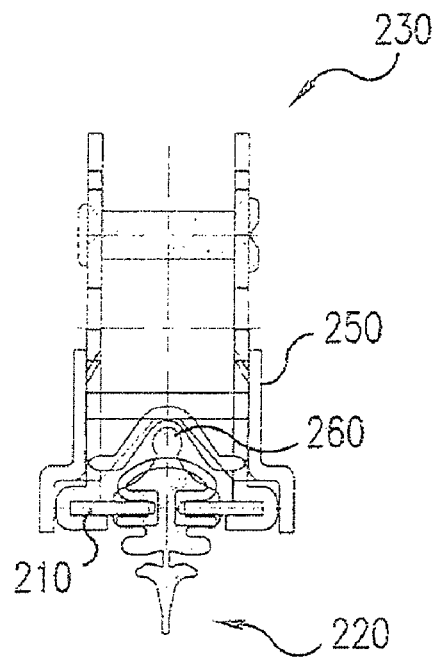
FIG. 12 is a cross-section view of the second exemplary embodiment of the windshield wiper assembly.
Figure 13:
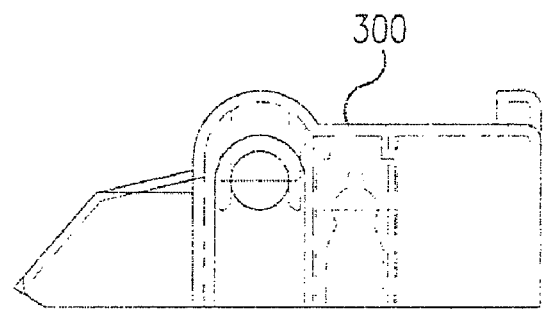
FIG. 13 is an elevation view of an adapter configured to cooperate with the bracket of the windshield wiper assembly of the first and second exemplary embodiments.
Figure 14:
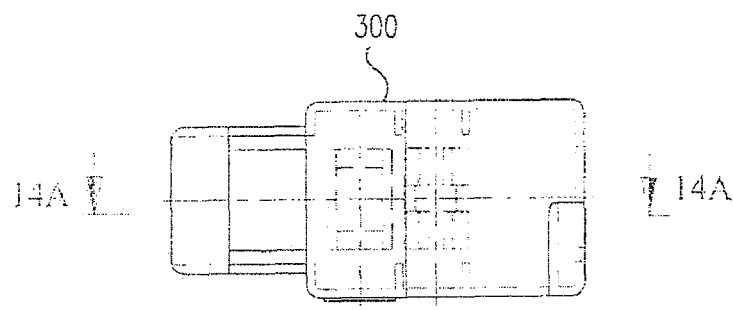
FIG. 14 is a top plan view of the adapter of FIG. 13.
Figure 14A:
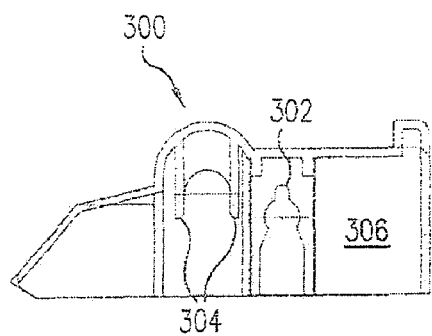
FIG. 14A is a cross-sectional view of the adapter at sectional line 14A-14A of FIG. 14.

FIG. 12 is a cross-sectional view similar to the view of FIG. 1A showing the pair of leaf spring elements 210, wiper blade 220, bracket 230, and bracket 250 in an assembled relationship. The spoiler 260 formed integrally with the wiper blade 220 freely passes through the bracket cover 250 and bracket 230.

Having described two exemplary embodiments of the windshield wiper assembly, FIGS. 13-18 show various adapters that can be used with either exemplary embodiment of the windshield wiper assembly to attach the windshield wiper assembly to several different windshield wiper arms.

As shown in FIGS. 13, 14, 14A, and 14B an adapter 300 for attaching various conventional side pin windshield wiper arms is provided. In particular adapter 300 includes a pair of clips 302 that are configured to cooperate with post 172 of the bracket 130 to secure the adapter 300 to the bracket 130. A separate pair of clips 304 is formed to correspond to the pair of second through holes 176 to receive the pin of the windshield wiper arm.

Figure 15:
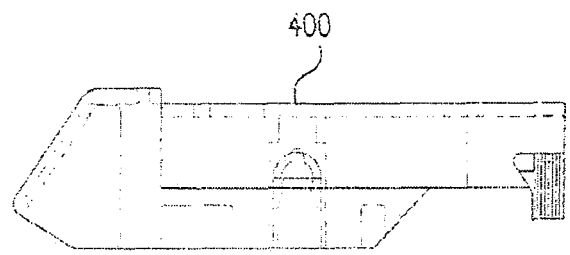
FIG. 15 is an elevation view of another adapter configured to cooperate with the bracket of the windshield wiper assembly of the first and second exemplary embodiments.
Figure 16:
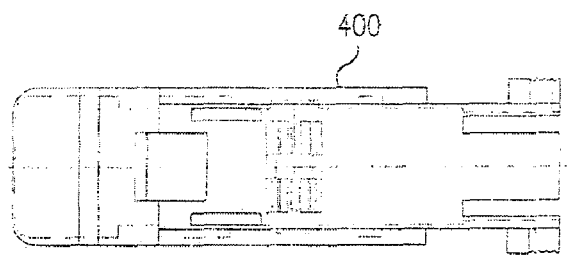
FIG. 16 is a top plan view of the adapter of FIG. 15.

As shown in FIGS. 15 and 16, an adapter 400 for attaching various conventional pinch tab windshield wiper arms is provided. The adapter 400 includes a pair of clips (not shown) that are configured to cooperate with post 172. The pinch tab windshield wiper arms are inserted through a rear opening of the adapter 400.

Figure 17:
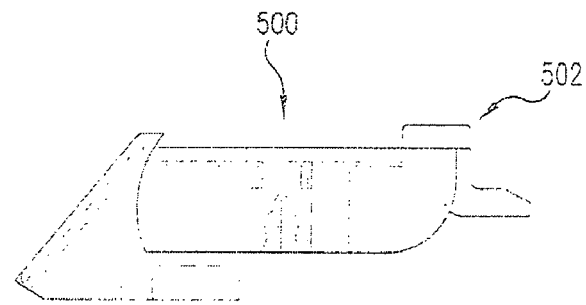
FIG. 17 is an elevation view of yet another adapter configured to cooperate with the bracket of the windshield wiper assembly of the first and second exemplary embodiments.
Figure 18:
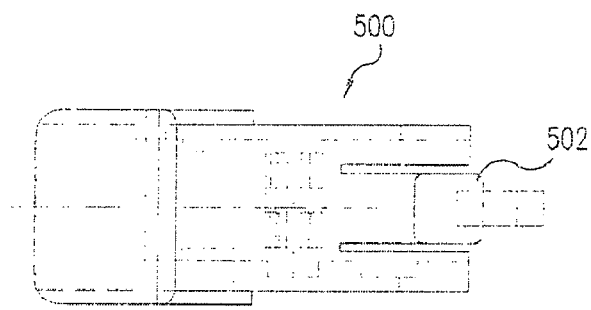
FIG. 18 is a top plan view of the adapter of FIG. 17.

As shown in FIGS. 17 and 18, an adapter 500 for attaching various conventional pinch tab windshield wiper arms having a release button is provided. The adapter 500 includes a pair of clips (not shown) that are configured to cooperate with post 172. The adapter 500 includes a pressable member 502 for releasing the pinch tab windshield wiper arm.

Figure 19:
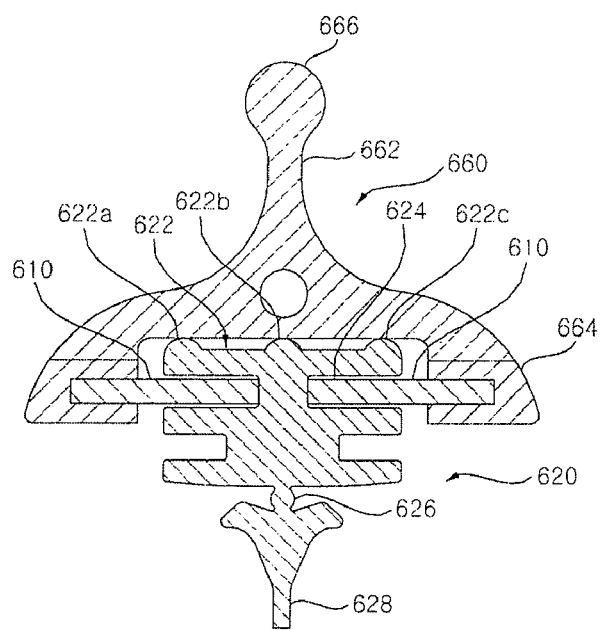
FIG. 19 is cross-sectional view of another exemplary embodiment of the windshield wiper assembly similar to FIG. 1B.

While the present invention has been described with reference to two different wiper blade configurations, other configurations of the wiper blade and/or spoiler configurations are possible, including those set forth in the priority applications. For example, as shown in FIG. 19, an exemplary wiper blade 620 and spoiler 660 are provided. The spoiler 660 is constructed of flexible synthetic rubber material and includes a long narrow neck 663. In addition, a base 664 of rigid plastic is integrally molded with the long narrow neck 663. Finally, the spoiler 660 includes a ball shaped protuberance 666 formed on a top thereof. The ball shaped protuberance 666 is centered with a longitudinal center line of the wiper blade 620. The ball shaped protuberance 666 also increases the holding force of the wiper blade 620 by forming a vortex that increases the low pressure zone on the side of the wiper blade 620 opposite to the source of wind as it flows across the wiper blade assembly 100.

As also seen in FIG. 19, the wiper blade 620 includes a base portion 622 that includes cut-outs 624 to receive the leaf spring elements 110. A hinge portion 626 connects the blade portion 628 to the base portion 622. In addition, the base portion 622 includes a plurality of humps 622a, 622b, and 622c that extend the length of the wiper blade 620. The three humps 622a, 622b, and 622c contact the bottom of the spoiler 660 so that any frictional contact between the wiper blade 620 and spoiler 660 may be minimized. In addition, the amount of material used to form the base portion 622 can be minimized.

Figure 20:
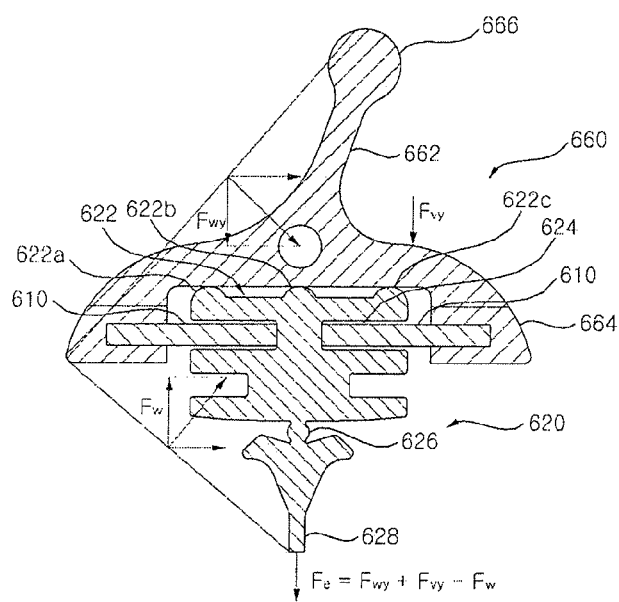
FIG. 20 is a diagram showing wind power distributions of the windshield wiper assembly of FIG. 19.

Because of this configuration of the spoiler 660, with its increased surface area from the long narrow neck 662 and ball shaped protuberance 666, high speed wind power that deflects the top of the spoiler 660 can be used to provide additional pressing force to hold the wiper blade 620 in contact with a windshield. For example, as shown in FIG. 20, the amount of extra wiping force, which is in addition to the amount of force provided by the windshield wiper arms and the leaf spring elements 110, provided by the configuration of the spoiler 660 and the wiper blade 620 can be summarized as:

$$F_e = F_{vy} + F_{vy} - F_{wl};$$

where $F_e$ is the extra wiping force generated by the spoiler 660 and wiper blade 620, $F_{vy}$ is the force generated by the vertical component of the wind pressure acting on the front face of the spoiler 620, $F_{vy}$ is the force generated by the vertical component of the vortex pressure acting on the rear surface of the spoiler, and $F_{wl}$ is the amount of lift generated by the wind pressure acting on the front of the assembly. By inducing a vortex at the rear of the spoiler, the amount of extra wiping force can be increased.

Figure 21:
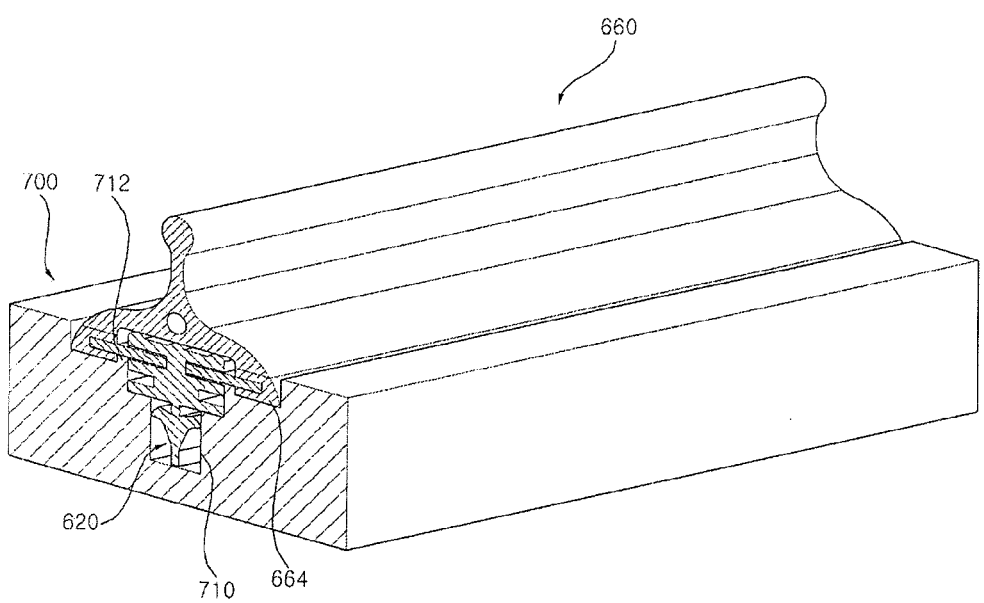
FIG. 21 shows an exemplary method of mounting a spoiler to the leaf spring elements of a windshield wiper assembly.

Because the leaf spring elements of the present invention are generally curved while in a relaxed state, a magnetizable assembly die 700, as shown in FIG. 21, may be used to hold the leaf spring elements flat such that the spoiler wiper blade 620 and spoiler 660 can be attached to the leaf spring elements. In particular, die 700 may include a cut-out portion 710 that receives the wiper blade 620 and two raised portions 712 to support the leaf spring elements. As a result, the wiper blade 620 and spoiler 660 can be easily attached to the leaf spring elements.

Figure 22:
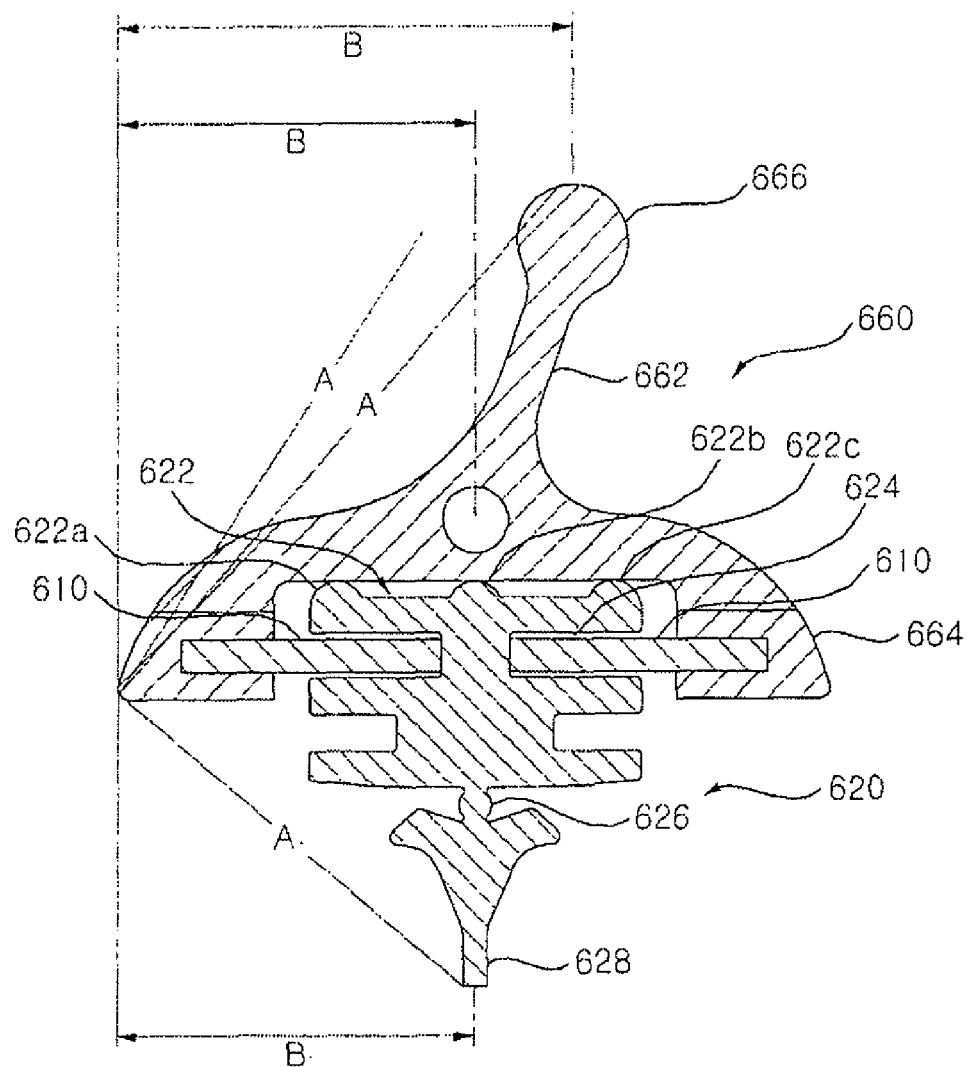
FIG. 22 is a cross-sectional view for explaining that windbreak area of a spoiler in a windshield wiper assembly varies depending on speed of wind.

FIG. 22 is a cross-sectional view for explaining that windbreak area of a spoiler 660 in a windshield wiper assembly 600 varies depending on speed of wind. Referring to FIG. 22, when a vehicle is driving at low speed, the spring pressure of the wiper arm is large, and the topside wind-break area proportional to length of a line connecting the protuberance 666 and the base 664 (that is, A1) is longer than the bottomside wind-break area proportional to length of a line connecting the blade 628 and the base 664 (that is, A3). Therefore, the pressure acting on the topside wind-break area gets to be greater than the pressure acting on the bottomside wind-break area, so that the wiper blade 620 is prevented from coming off the wind shield. On the other hand, when the vehicle is driving at high speed, since the long narrow neck 662 is leaned back, the line connecting the protuberance 666 and the base 664 become A2, so that the distance between the protuberance 666 and base 664 is increased. Accordingly, since the topside wind-break area gets to be greater, the wiper blade 620 is completely prevented from coming off. In order words, as the line connecting the protuberance 666 and the base 664 is increased from A1 to A2, a length directly relating to vertical component of the pressure acting on the topside wind-break area is increased from B1 to B2 considerably, thus, the wiper blade 620 is completely prevented from coming off.

The invention thus being described, it will be obvious that the same may be varied in many ways. For example, an upper surface of each side wall of the bracket may have a notch formed therein if necessary to accommodate various adapters. Such variations are not to be regarded as a departure from the spirit and scope of the invention, and all such modifications as would be obvious to one skilled in the art are intended to be included within the scope of the following claims.

What is claimed:

1. A windshield wiper assembly, comprising:
a pair of leaf spring elements supported generally parallel to each other with a space therebetween, each leaf spring element including a locating hole at an intermediate portion thereof;
a flexible blade supported within the space between the leaf spring elements; and
a bracket fixed to the intermediate portion of the pair of leaf spring elements and supporting said pair of leaf spring elements to provide the space therebetween, the bracket including a pair of pressure distribution tabs, each pressure distribution tab extending from opposite sides of the bracket, each pressure distribution tab being received in a corresponding one of the locating holes of the pair of leaf spring elements to locate the bracket at the intermediate portion of the pair of leaf spring elements, wherein each of the leaf spring elements includes a first fixing slot located adjacent the locating hole, and wherein the bracket includes a first pair of fixing tabs, each of the first pair of fixing tabs extending from said opposite sides of the bracket, each of the first pair of fixing tabs being received in one of the first fixing slots of the pair of leaf spring elements to attach the bracket at the intermediate portion of the pair of leaf spring elements, each of the leaf spring elements includes a second fixing slot located adjacent the locating hole and opposite the first fixing slot, the bracket includes a second pair of fixing tabs, each of the second pair fixing tabs extending from said opposite sides of the bracket, each of the second pair of fixing tabs being received in one of the second fixing slots of the pair of leaf spring elements to attach the bracket at the intermediate portion of the pair of leaf spring elements, and each fixing tab of the first and second pairs of fixing tabs are substantially u-shaped members.

2. The wiper assembly according to claim 1, wherein the bracket is made as a single piece of sheet metal.

3. A windshield wiper assembly, comprising:
a pair of leaf spring elements supported generally parallel to each other with a space therebetween, each leaf spring element including a locating hole at an intermediate portion thereof;
a flexible blade supported within the space between the leaf spring elements; and
a bracket fixed to the intermediate portion of the pair of leaf spring elements and supporting said pair of leaf spring elements to provide the space therebetween, the bracket including a pair of pressure distribution tabs, each pressure distribution tab extending from opposite sides of the bracket, each pressure distribution tab being received in a corresponding one of the locating holes of the pair of leaf spring elements to locate the bracket at the intermediate portion of the pair of leaf spring elements,
wherein the bracket includes a base portion fixed to the pair of leaf spring elements, and a pair of side walls extending upward from the base portion, and
each side wall includes a pair of substantially u-shaped fixing tabs extending therefrom to hold a corresponding leaf spring element of the pair of leaf spring elements.

4. The wiper assembly according to claim 3, wherein the base portion includes the pair of pressure distribution tabs extending from the base portion.

5. The wiper assembly according to claim 3, wherein each side wall includes a first through hole located substantially in the center of the bracket.

6. The wiper assembly according to claim 5, wherein the bracket includes a post extending between the pair of side walls, and the post, the first through hole, and the pressure distribution tab are substantially aligned along a straight line.

7. The wiper assembly according to claim 6, wherein the straight line is substantially perpendicular to the intermediate portion of the pair of leaf spring elements.

8. The wiper assembly according to claim 6, wherein each side wall includes a pair of substantially u-shaped fixing tabs extending therefrom to hold a corresponding leaf spring element of the pair of leaf spring elements, the post and the first fixing hole being located between the substantially u-shaped fixing tabs.

9. The wiper assembly according to claim 5, wherein each side wall includes a second through hole located above and off-center from the first through hole.

10. The wiper assembly according to claim 9, wherein the bracket includes a post extending between the pair of side walls, and the post, the first through hole, and the pressure distribution tab are substantially aligned along a straight line.

11. A windshield wiper assembly, comprising:
a pair of leaf spring elements supported generally parallel to each other with a space therebetween, each leaf spring element including a locating hole at an intermediate portion thereof;
a flexible blade supported within the space between the leaf spring elements; and
a bracket fixed to the intermediate portion of the pair of leaf spring elements and supporting said pair of leaf spring elements to provide the space therebetween, the bracket including a pair of pressure distribution tabs, each pressure distribution tab extending from opposite sides of the bracket, each pressure distribution tab being received in a corresponding one of the locating holes of the pair of leaf spring elements to locate the bracket at the intermediate portion of the pair of leaf spring elements,
wherein the bracket includes a base portion fixed to the pair of leaf spring elements, and a pair of side walls extending upward from the base portion,
each side wall includes a first through hole located substantially in the center of the bracket,
the bracket includes a post extending between the pair of side walls, and the post, the first through hole, and the pressure distribution tab are substantially aligned along a straight line, and
each side wall includes a pair of substantially u-shaped fixing tabs extending therefrom to hold a corresponding leaf spring element of the pair of leaf spring elements, the post and the first fixing hole being located between the substantially u-shaped fixing tabs.

* * * * *